(12) United States Patent
Miyauchi et al.

(10) Patent No.: US 7,423,822 B2
(45) Date of Patent: Sep. 9, 2008

(54) LENS BARREL AND OPTICAL APPARATUS

(75) Inventors: Masanori Miyauchi, Saitama (JP); Yasuhide Takahashi, Saitama (JP)

(73) Assignee: Tamron Co., Ltd., Saitama-shi, Saitama (JP)

( * ) Notice: Subject to any disclaimer, the term of this patent is extended or adjusted under 35 U.S.C. 154(b) by 0 days.

(21) Appl. No.: 11/715,913

(22) Filed: Mar. 9, 2007

(65) Prior Publication Data
US 2007/0217036 A1 Sep. 20, 2007

(30) Foreign Application Priority Data
Mar. 9, 2006 (JP) .............................. 2006-064270

(51) Int. Cl.
*G02B 7/02* (2006.01)
(52) U.S. Cl. .................. 359/819; 359/822; 359/823; 359/826; 359/701; 396/72; 396/79; 396/349
(58) Field of Classification Search ............... 359/811, 359/819, 822, 823, 825–827, 422, 426–428, 359/513, 740, 694–701; 396/72, 73, 79, 396/85, 133, 147, 349, 462, 529, 533, 448; 353/69, 100, 101; 348/335, 357, 375; 352/140
See application file for complete search history.

(56) References Cited
U.S. PATENT DOCUMENTS 2,908,209 A * 10/1959 Marvin et al. ............... 359/826
3,484,159 A * 12/1969 O'Donnell et al. .......... 352/140
4,303,306 A * 12/1981 Ookawa ...................... 359/819
6,751,032 B2 * 6/2004 Nomura et al. ............. 359/819
6,909,464 B2 * 6/2005 Nomura et al. ............. 348/357
7,259,923 B2 * 8/2007 Nuno et al. .................. 359/819

FOREIGN PATENT DOCUMENTS
JP 2000-180689 6/2000
JP 2001-305409 10/2001

* cited by examiner

*Primary Examiner*—Loha Ben
(74) *Attorney, Agent, or Firm*—Jacobson Holman PLLC

(57) ABSTRACT

The present invention is directed to a lens barrel that is simplified in structure with the reduced number of components and is facilitated in assembly and associated adjustment. The lens barrel enables an appropriate frictional force against the rotation force caused by manipulating rotary operation rings such as a zooming ring and a focusing ring to effect the optimum operating force on the rotary operation rings. In the lens barrel where a fixed barrel has its inner and outer circumferential surfaces provided with at least two slidable-rotatable members that are rotatably held about the optical axis but unable to move along the optical axis, an annular member is secured to the fixed barrel between the slidable-rotatable members, the annular member being pivotal about the optical axis and being provided with resilient protrusions on the opposite major surfaces toward the subject and the image field; and the resilient protrusions are pressed against a rear end face of one of the slidable-rotatable members closer to the subject and against a fore end face of the other slidable-rotatable member closer to the image field.

8 Claims, 7 Drawing Sheets

LENS BARREL AND OPTICAL APPARATUS

FIELD OF THE INVENTION

The present invention relates to a lens barrel and an optical device, and more particularly, it relates to a lens barrel and an optical device that enable an appropriate frictional force against a rotation force caused by manipulating rotary operation rings such as a zooming ring and a focusing ring to effect the optimum operating force on the rotary operation rings.

BACKGROUND ART

With reference to FIG. 8, a prior art lens barrel as disclosed in Document 1 listed below comprises a fixed lens barrel 201 that has a raised portion 201a circularly extending along the entire outer circumferential surface and a longitudinal groove 201b in parallel with the optical axis. A fore lens frame 205 holds a fore group of component lens pieces (or a fore lens group) 204, and is provided with a projection 205a provided in the outer circumferential surface and passing through the groove 201b.

A zooming ring (or a focusing ring) 202 is fitted on the outer circumferential surface of the fixed lens barrel 201 and the fore lens frame 205, and is rotatable about the optical axis. The zooming ring 202 includes a projected portion 202a radially extended to engage with the raised portion 201a, and a cam groove 202b in which a tip of the projection 205a is fitted. The cam groove 202b runs helically in an inner circumferential surface of the zooming ring 202, and rotating the zooming ring 202 in a circumferential direction permits the projection 205a to move along the optical axis. Since the projection 205a is fitted in and passed through longitudinal groove 201b, the fore lens frame 205 and the fore lens group 204 are capable of linearly moving along the optical axis relative to the fixed lens barrel 201.

A fixed ring 203 includes threads 210 engaged with a fore end of the fixed lens barrel 201, and a pusher 214 pressing against a wavy washer 212. The wavy washer 212 is pressed rearward from the side closer to the subject by the pusher 214, and this urges the projected portion 202a of the zooming (or focusing) ring 202 to move rearward under a predetermined pressing force. The projected portion 202a is squeezed between the wavy washer 212 and the raised portion 201a of the fixed lens barrel 201, namely, between two points in a line along the optical axis.

Arranged in such a manner, the lens barrel has the zooming ring 202 tightly abutted against the fixed lens barrel 201 without looseness along the optical axis, and the lens barrel enables an appropriate frictional force against the rotation force caused by manipulating rotary operation rings such as the zooming (or focusing) ring so as to rotate the zooming (or focusing) ring over the outer circumferential surface of the fixed lens barrel 201 with a torque imparted thereon in some predetermined perceptible degree.

Another prior art embodiment of the lens barrel is disclosed in Document 2 listed below. The lens barrel, as recognized in FIG. 9, includes a hollow cylinder-like lens barrel body, one or more movable lens frame(s) disposed inside the lens barrel body and slidable along the optical axis, a guide member guiding the movable lens frame along the optical axis, a cam ring 318 rotatable about an axis along the optical axis inside or outside the lens barrel body and provided with cam grooves 332 that serve to slide the movable lens frame along the optical axis in response to the rotation of the cam ring, and a plurality of pusher means 324 located in a fore or rear end of the cam ring 318 to press the cam ring 318 against the lens barrel body in a single direction along the optical axis. At any location of the fore or rear end of the cam ring 318 pressed by the pusher means 324 other than the point where a trajectory of any of the cam grooves 332 is closest to the fore or rear end, receptacles 344 are formed to drop and rest the pusher means 324 therein.

In still another prior art embodiment of the lens barrel, grease may be applied to junctions of the outer circumferential surface of the fixed barrel with the inner circumferential surface of the zooming (or focusing) ring so as to utilize a viscosity of the grease to impart torque in some perceptible degree.

Patent Document 1: Japanese Patent Preliminary Publication No. 2001-305409

Patent Document 2: Japanese Patent Preliminary Publication No. 2000-180689

Since the prior art lens barrel disclosed in Document 1 is provided with a plurality of operation rings, there must be the wavy washers as many as the operation rings to press against the projected portion of the operation rings. Thus, the wavy washers as many as the operation rings desired to impart some appropriate touch of torque must be available in advance. In addition, in order to attain the optimum torque or operation force in manipulating any of the operation rings, namely, in order to impart the torque by an adequate touch, a variety of elastic members, or a variety of wave washers in this case, of various angles and/or various dimensions must be prepared. This brings about an increase in the manufacturing cost as well as the complicatedness of maintaining each component. In fabricating the lens barrel, using such a wider variety of wave washers is prone to lead to troubles during the assembling and the increased number of essential components.

In the variation of the exemplary lens barrel disclosed in Document 2, elastic members in FIGS. 4 and 5 of Document 2, namely, resilient members 46A, 46C and a beam 46D are integrally formed. Such an integrated elastic element of the resilient members 46A, 46C and the beam 46D is advantageous in reducing the number of components as well as the steps of assembly, but the issue left unimproved is that the elastic element must be still required for each of the operation rings. Another issue also left unimproved is that a variety of elastic members, or a variety of wave washers in this case, of various angles and/or various dimensions must be prepared in order to attain an appropriate touch of torque on the operation rings.

When grease is applied to junctions of the outer circumferential surface of the fixed barrel with the inner circumferential surface of any of the operation rings so as to utilize a viscosity of the grease to impart torque in some perceptible degree, an amount of the applied grease and a variation in temperature vary a reaction force of manipulation. Thus, the touch of the torque imparted on the operation ring is unstable, and the grease adversely infiltrates into surfaces of the component lens pieces as a temperature rises.

The present invention is made to overcome the aforementioned disadvantages of the prior art embodiments of the lens barrel, and accordingly, it is an object o the present invention to provide a lens barrel that enables an appropriate frictional force against the rotation force caused by manipulating rotary operation rings such as a zooming ring and a focusing ring to effect the optimum operating force on the rotary operation rings. Thus, since a single resilient element is used to press simultaneously against two of the operation rings, the lens barrel can reduce the number of the components and the steps of assembly and can effectively attain downsizing and cost reduction, compared with a case where two of the operation rings are associated with their respective resilient elements to impart a torque on the operation rings.

It is another object of the present invention to provide a lens barrel capable of retaining a constant operation torque, namely, an operation force regardless of a variation in atmospheric temperature.

SUMMARY OF THE INVENTION

In accordance with a first aspect of the present invention, in a lens barrel where a fixed barrel has its inner and outer circumferential surfaces provided with at least two slidable-rotatable members that are rotatably held about the optical axis but unable to move along the optical axis, an annular member is secured to the fixed barrel between the slidable-rotatable members, the annular member being pivotal about the optical axis and being provided with resilient protrusions on the opposite major surfaces toward the subject and the image field; and the resilient protrusions are pressed against a rear end face of one of the slidable-rotatable members closer to the subject and against a fore end face of the other slidable-rotatable member closer to the image field.

In accordance with a second aspect of the present invention, in an optical device where a fixed barrel has its inner and outer circumferential surfaces provided with at least two slidable-rotatable members that are rotatably held about the optical axis but unable to move along the optical axis, an annular member is secured to the fixed barrel between the slidable-rotatable members, the annular member being pivotal about the optical axis and being provided with resilient protrusions on the opposite major surfaces toward the subject and the image field; and the resilient protrusions are pressed against a rear end face of one of the slidable-rotatable members closer to the subject and against a fore end face of the other slidable-rotatable member closer to the image field.

The present invention may be exemplified in manners as mentioned below:

The protrusions provided in the annular member are fitted in grooves provided in the fixed barrel in order to secure the annular member to the fixed barrel, the grooves being perpendicular to the optical axis and contiguous to grooves extending along the optical axis.

Designed in this manner with the reduced number of components and the simplified configuration, the lens barrel and the optical device can adjust a frictional force against a rotary operation force of rotary operation members so as to impart an appropriate touch of torque on the rotary operation members.

Each of the groove perpendicular to the optical axis is branched more than one in number and provided in more than one depths along the optical axis of the fixed barrel.

Designed in this manner without a replacement of the components but a simple variation in a way of the assembling, the lens barrel and the optical device can adjust a frictional force against a rotary operation force of rotary operation members so as to impart an appropriate touch of torque on the rotary operation members.

The fixed barrel is comprised of two barrel members jointed with each other on the edge-to-edge basis in a direction along the optical axis, and both the barrel members, when jointed together, create an abutment at which an object is retained between them.

The object retained between the barrel members is the annular member, and the annular member is secured to the fixed barrel when the barrel members jointed together squeeze the protrusions provided in the annular member.

Designed in this manner with the reduced components and the simplified configuration, the lens barrel and the optical device can adjust a frictional force against a rotary operation force of rotary operation members so as to impart an appropriate touch of torque on the rotary operation members.

The abutment created by the barrel members jointed together is segmented more than one in number and located in more than one depths along the optical axis of the fixed barrel.

Designed in this manner without a replacement of the components but with a simple variation in a way of the assembling, the lens barrel and the optical device can adjust a frictional force against a rotary operation force of rotary operation members so as to impart an appropriate touch of torque on the rotary operation members.

A lens barrel according to the present invention is simplified in structure with the reduced number of components and is facilitated in assembly and associated adjustment. The lens barrel enables an appropriate frictional force against the rotation force caused by manipulating rotary operation rings such as a zooming ring and a focusing ring to effect the optimum operating force on the rotary operation rings. Specifically, since a single resilient element is enough to press simultaneously against two of the operation rings, the lens barrel is advantageous in that it can reduce the number of the components and the steps of assembly and can effectively attain downsizing and cost reduction, compared with a case where two of the operation rings are associated with their respective resilient elements to impart a torque on the operation rings.

Moreover, the lens barrel is capable of retaining a constant operation torque, namely, an operation force regardless of a variation in atmospheric temperature.

DETAILED DESCRIPTION OF THE INVENTION

Best Mode of the Invention

Preferred embodiments of lens barrels according to the present invention will now be described by way of examples only in conjunction with the accompanying drawings.

Embodiment 1

Figure 1:
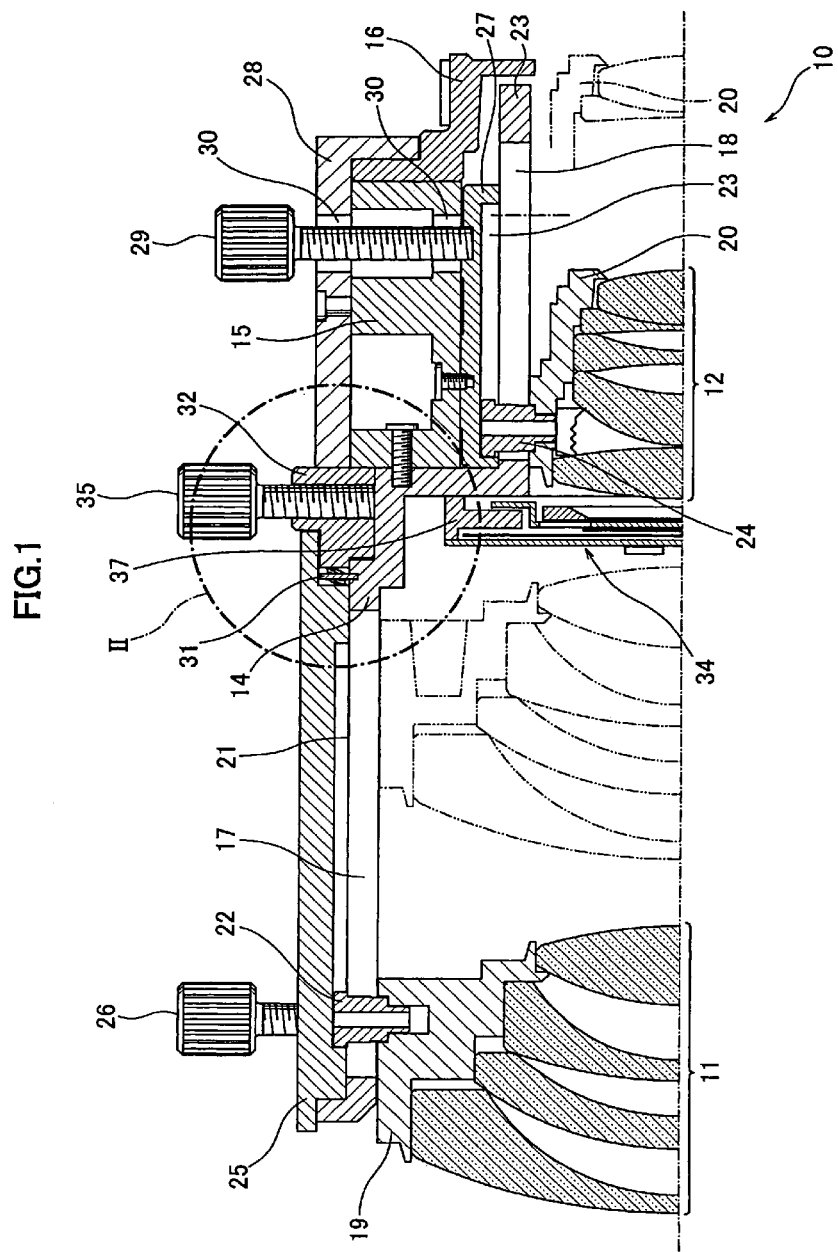
FIG. 1 is a partial sectional view illustrating a first preferred embodiment of a lens barrel according to the present invention.
Figure 2:
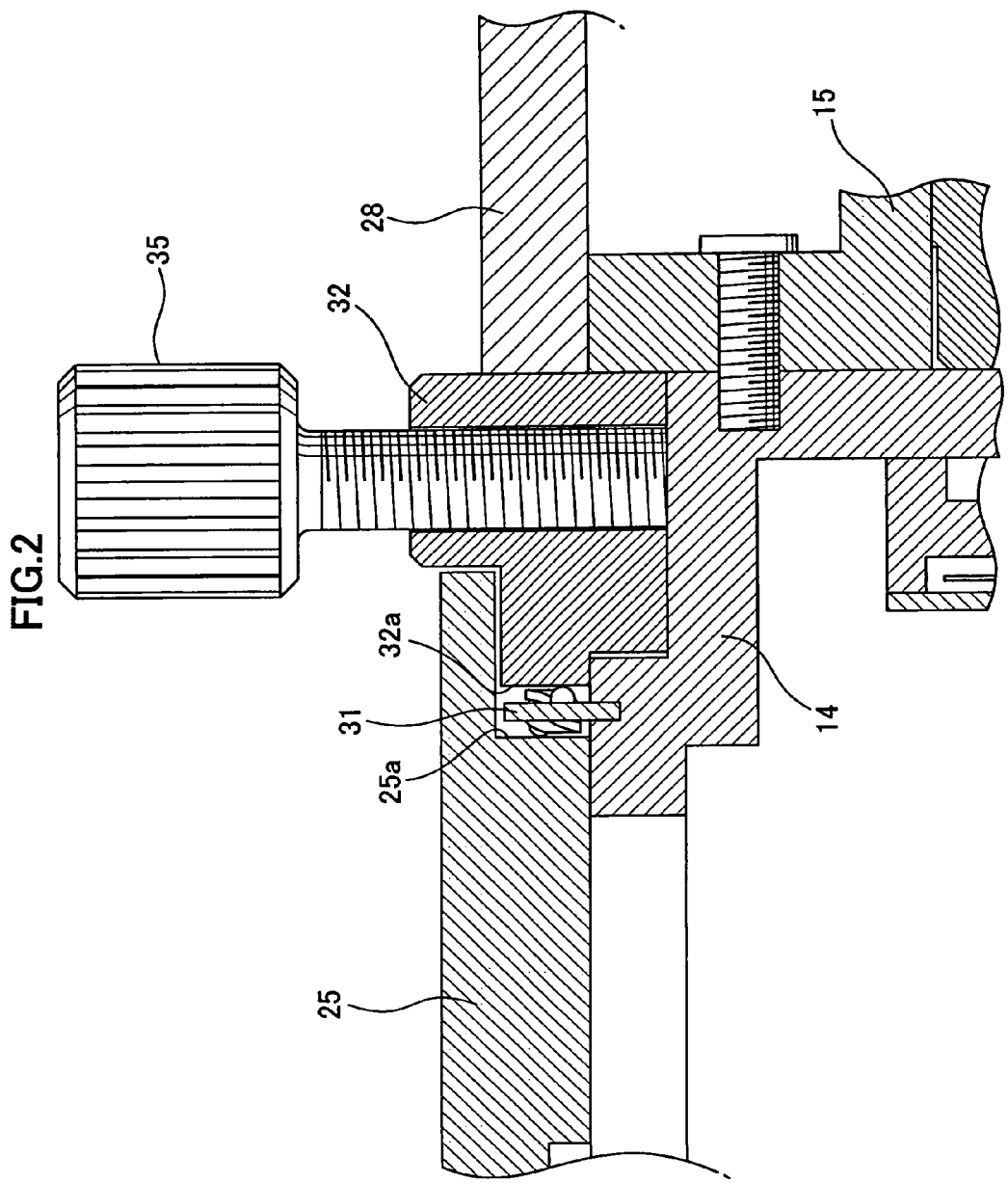
FIG. 2 is a partial enlarged sectional view of a portion encircled and designated by II in FIG. 1.

A first exemplary lens barrel 10 includes, as partially shown in FIGS. 1 and 2, a first group of component lens pieces 11 and a second group of component lens pieces 12. The lens barrel 10 has a first fixed barrel 14 integrally formed with a mount 16 at which the lens barrel is attached to a camera body (not shown). The first fixed barrel 14 has longitudinal focusing grooves 17 and longitudinal zooming grooves 18 engraved therein.

Inside the first fixed barrel 14, a first lens-holding frame 19 holding the first group of component lens pieces (referred to as the "first lens group" hereinafter) 11 is slidably disposed. The first lens-holding frame 19 includes focusing studs 22 slidably fitted in both the longitudinal focusing grooves 17 and focusing cam grooves 21, respectively.

Over an outer circumferential surface of the first fixed barrel 14, a focusing drive ring 25 is slidably disposed, having focusing cam grooves 21 engraved inside. Focusing pins 26 are screwed down to attach the focusing drive ring 25 to the first lens holding frame 19.

A second fixed barrel 15 is fixedly disposed behind the first fixed barrel 14, being closer to the image field. Over an inner circumferential surface of the second fixed barrel 15, a second lens holding frame 20 holding the second group of component lens pieces (referred to as the "second lens group" hereinafter) 12 is disposed. The second lens holding frame 20 includes zooming studs 24 fitted in the longitudinal zooming grooves 18 and zooming cam grooves 23, respectively. Over an inner circumferential surface of the second fixed barrel 15, a zooming drive ring 27 is slidably disposed, having the zooming cam grooves 23 engraved therein. Surrounding the zooming drive ring 27, a cover 28 is attached thereto by the second fixed barrel 15. Zooming pins 29 fixed to the zooming drive ring 27 extends through slits 30 that are defined and mutually aligned in the second fixed barrel 15 and the cover 28 to form successive through-holes.

A diaphragm unit 34 is located behind the focusing drive ring 25, closer to the image field. The diaphragm unit 34 includes a holder frame 37 holding upper and lower vanes (not shown) to linearly move them, an aperture drive ring 32 rotatably held relative to the holder frame 37, and a diaphragm vane retainer (not shown) retaining the upper and lower vanes relative to the holder frame 37. The diaphragm drive ring 32 has diaphragm operating pins 35 fixed thereto. Manipulating the diaphragm operating pins 35 enables the diaphragm drive ring 32 to rotate so as to adjust a diaphragm aperture.

Figure 3:
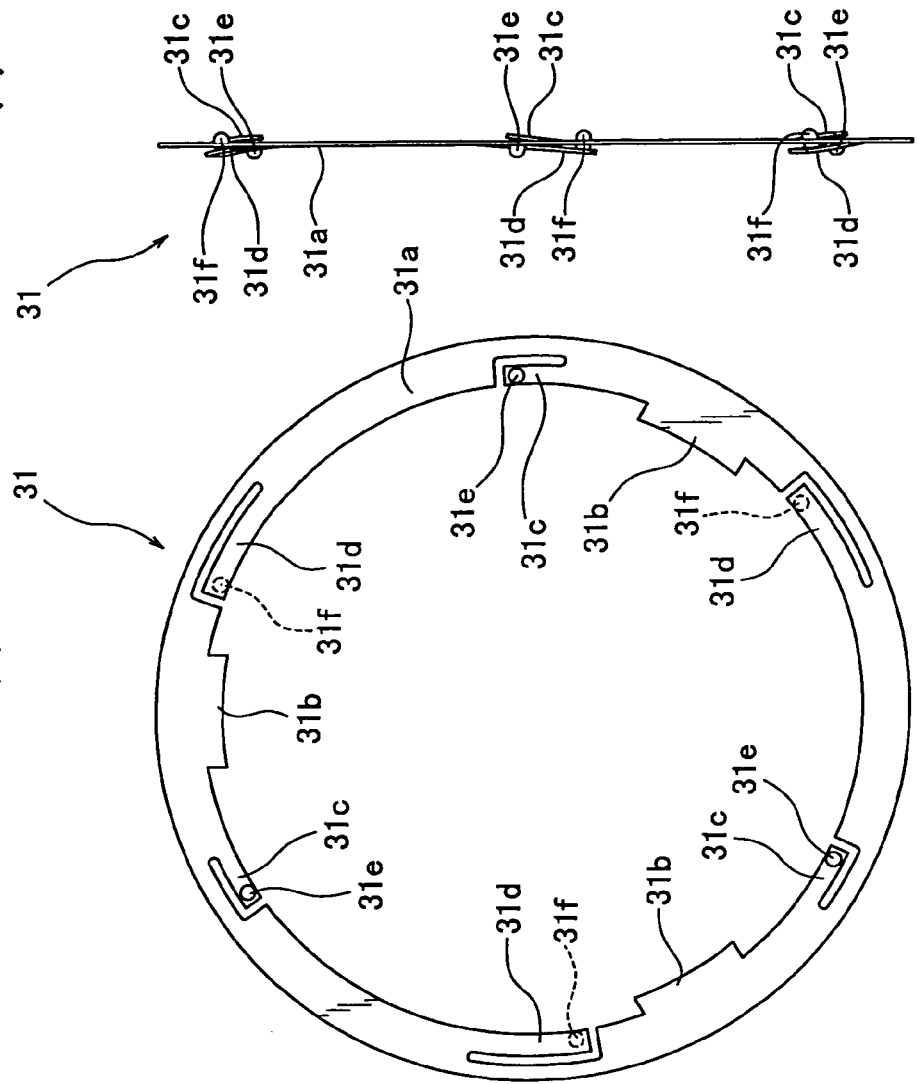
FIG. 3(a) is a frontal view of a spring elastic member in the first embodiment of the present invention.
FIG. 3(b) is a side view of the same.

A spring elastic member 31 attached to the first fixed barrel 14 is placed between an end surface of the focusing drive ring 25 closer to the image field and that of the diaphragm drive ring 32 closer to the subject. The spring elastic member 31 has, as shown in FIG. 3, a thin, planar substrate member 31a shaped like a ring. FIG. 3 includes a frontal view (3a) and a side view (3b) illustrating the spring elastic member 31 incorporated in a body such as the lens barrel. The substrate member 31a has detents 31b integrally formed in three points therein. There may be four or more of the detents 31b in the corresponding number of points equiangularly or non-eqiangularly separated from each other by an identical angle or by different angles. The detents 31b are fitted in recesses 33 located in the first fixed barrel 14, as mentioned later.

In a flat major surface of the substrate member 31 closer to the subject, first elastic members 31c are integrally formed in three points of the same. There may be four or more of the first elastic members 31c in the corresponding number of points equiangularly or non-equiangularly separated from each other by an identical angle or by different angles. The first elastic members 31c are elastically transformed when pressed against a flat face 25a of the focusing drive ring 25, and simultaneously rebounds from the flat face 25a to force the focusing drive ring 25 toward the subject. An abutment 31e of the first elastic members 31c against the flat face 25a of the focusing drive ring 25 is approximately spherical.

Second elastic members 31d are integrally formed in three points of a flat major surface of the substrate member 31a closer to the image field. There may be four or more of the second elastic members 31d equiangularly or non-equiangularly separated from each other by an identical angle or by different angles. The second elastic members 31d are elastically transformed when pressed against a flat face 32a of the diaphragm drive ring 32, and simultaneously rebounds from the flat face 32a to force the diaphragm drive ring 32 toward the image field. An abutment 31f of the second elastic members 31d against the flat face 32a of the diaphragm drive ring 32 is approximately spherical.

Acting force by the first and second elastic members, 31c and 31d, can be calculated, for example, by formulae set force in *Mechanical Engineering Manual*, Ver. 8, p. 107 (Sanseido Publishing Co., Ltd.).

Figure 4:
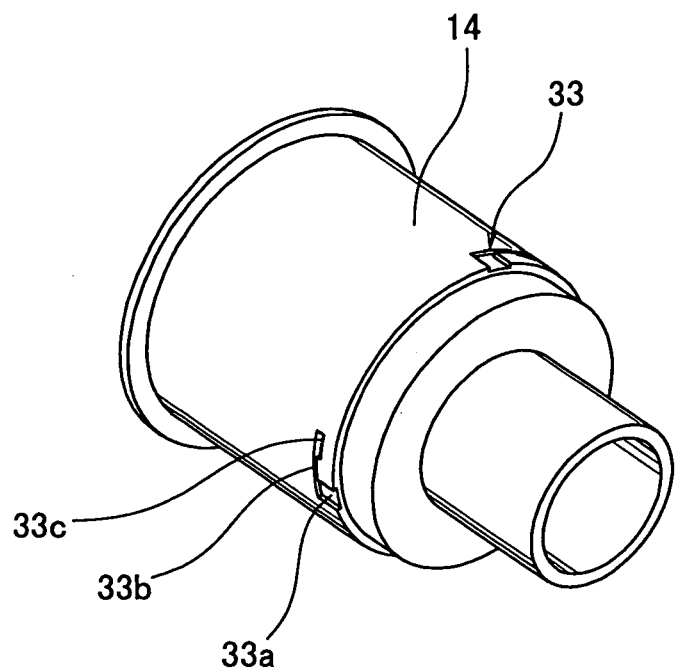
FIG. 4 is a perspective view illustrating a first fixed barrel in the first embodiment of the present invention.

The first fixed barrel 14 has its outer circumferential surface provided with recesses 33 in three points, as can be seen in FIG. 4, in which the detents 31b of the spring elastic member 31 are fitted. There may be four or more of the recesses 33, matching in number with the detents 31b. Each of the recesses 33 is comprised of a drop 33a into which the detent 31b of the spring elastic member 31 is preliminarily fitted, a rotary guide 33b leading from the drop 33a to permit the detent 31b to slide and rotate about the optical axis toward the subject, and a retaining socket 33c leading from the rotary guide 33b to fit the detent 31b therein toward the image field and retain the same in that position.

In this case, for instance, in order to apply greater force against the flat face 25a of the focusing drive ring toward the subject than against the flat face 32a of the diaphragm drive ring 32 toward the image field, an interval along the optical axis from the diaphragm drive ring 32 to the spring elastic member 31 may be varied, or the first and/or second elastic members, 31c and 31d, may be reshaped by varying their respective widths, lengths, and the like. In this way, the spring elastic member 31 can be assuredly captured in the retaining socket 33c of the first fixed barrel 14.

Although the first and second elastic members, 31c and 31d, are exemplified as in thin and flat portions, they may be shaped in raised or wavy portions somehow or other, allowing for the resiliency as desired.

In such a manner, the spring elastic member 31 on the side closer to the subject can be inserted in the recesses 33 of the first fixed barrel 14 and retained by the retaining sockets 33c so as not to rotate about the optical axis, and as a result of completing the attachment of the spring elastic member 31 to the first fixed barrel 14, the first and second elastic members 31c and 31d of the spring elastic member 31 seemingly frill the first fixed barrel 14 circumferentially outside the same. As has been stated, the torque can be adjustably imparted on each of the two operation rings 25 and 32 on the opposite sides of the spring elastic member 31 in an appropriate perceptible degree as desired by varying the interval along the optical axis between the focusing drive ring 25 and the spring elastic member 31 and/or reshaping the resilient portions of the spring elastic member 31.

With the lens barrel configuration as mentioned above, a frictional force of the focusing drive ring 25 against a rotation force applied thereto through the manipulation can be adjusted to impart a torque on the focusing pins 26 in some appropriate perceptible degree.

Similarly, the frictional force of the diaphragm drive ring 32 can be adjusted to impart a torque on the diaphragm operating pins 35 in an appropriate perceptible degree.

Figure 5:
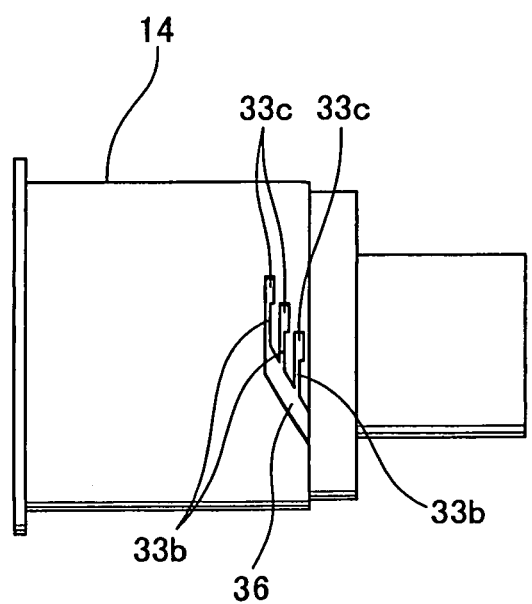
FIG. 5 is a frontal view illustrating the first fixed barrel in a first variation of the first embodiment according to the present invention.

A first variation of the first embodiment is, as shown in FIG. 5, an arrangement where the first fixed barrel 14 is provided with helical grooves 36 in combination with three sets of the rotary guide 33b and the retaining socket 33c of the spring elastic member 31 as discussed above. The additional helical grooves 36 serve to guide and rotate the spring elastic member 31 about the optical axis. This permits the spring elastic member 31 to move towards the subject while it keeps anchored to the first fixed barrel 14 in any of multi-stages of the retaining sockets 33c (three stages are shown herein), which enables a stepwise adjustment of the forward force applied by the spring elastic member 31.

With the lens barrel thus configured, a simple variation in a way of assembling the components without a replacement of them enables an adjustment of the frictional force of the focusing drive ring 25 against the rotation force applied thereto through the manipulation so as to impart a torque on the focusing pins 26 in an appropriate perceptible degree.

Similarly, additional simple variation in a way of assembling the components without a replacement of them enables an adjustment of the frictional force of the diaphragm drive ring 32 against the rotation force applied thereto through the manipulation so as to impart a torque on the diaphragm operating pins 35 in some appropriate perceptible degree.

Figure 6:
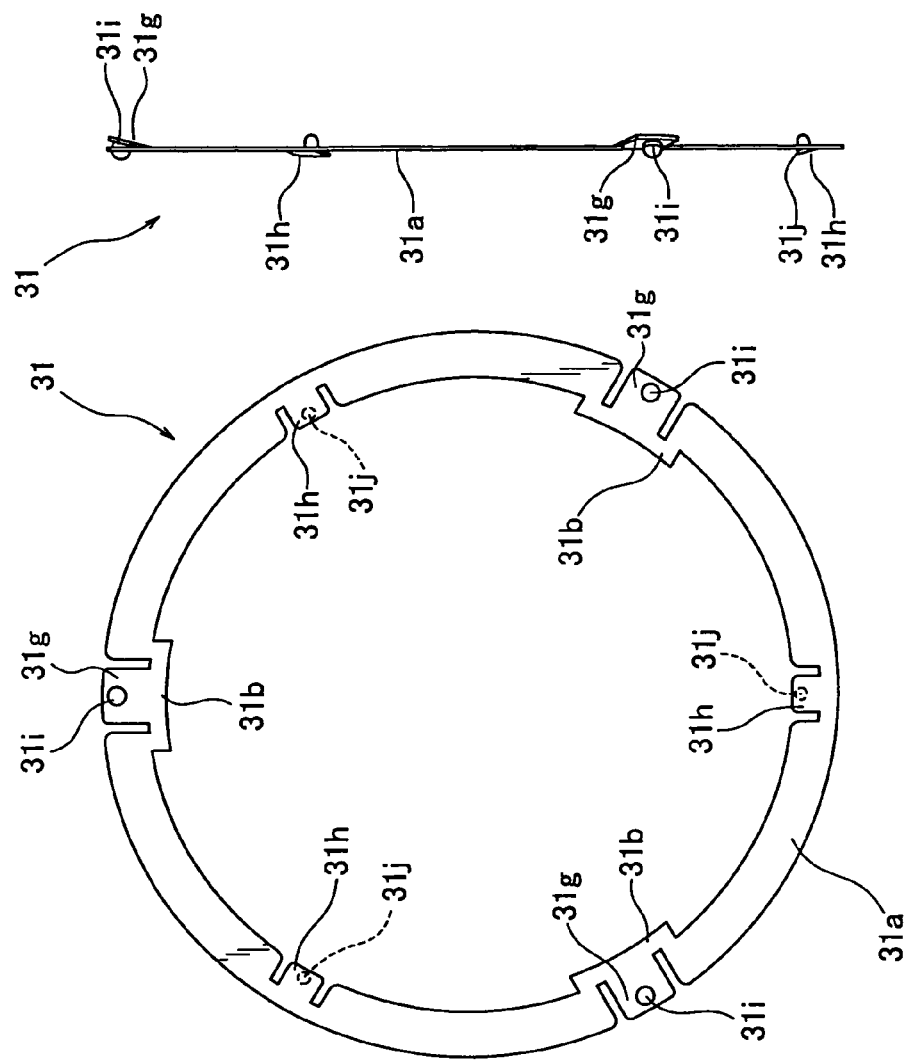
FIG. 6(a) is a frontal view illustrating the spring elastic member in a second variation of the first embodiment according to the present invention.
FIG. 6(b) is a side view of the same.

In a second variation of the first embodiment, as can be seen in FIG. 6, the spring elastic member 31 is further varied to have tabs in more than one points of its inner or outer circumferential surface, and the adjacent two of such tabs, 31g and 31h, for example, are accompanied by bulb-like projections 31i and 31j, respectively, which protrude on opposite sides either closer to the subject or to the image field, respectively, so as to provide elastic members applying resilient force in alternately opposite directions.

FIG. 6 includes a frontal view (6a) and a side view (6b) illustrating the spring elastic member 31 incorporated in a body such as the lens barrel.

Although the tabs represented by 31g and 31h are exemplified as in thin and flat portions, they may be shaped in raised or wavy portions somehow or other, allowing for the resiliency as desired.

Embodiment 2

Figure 7:
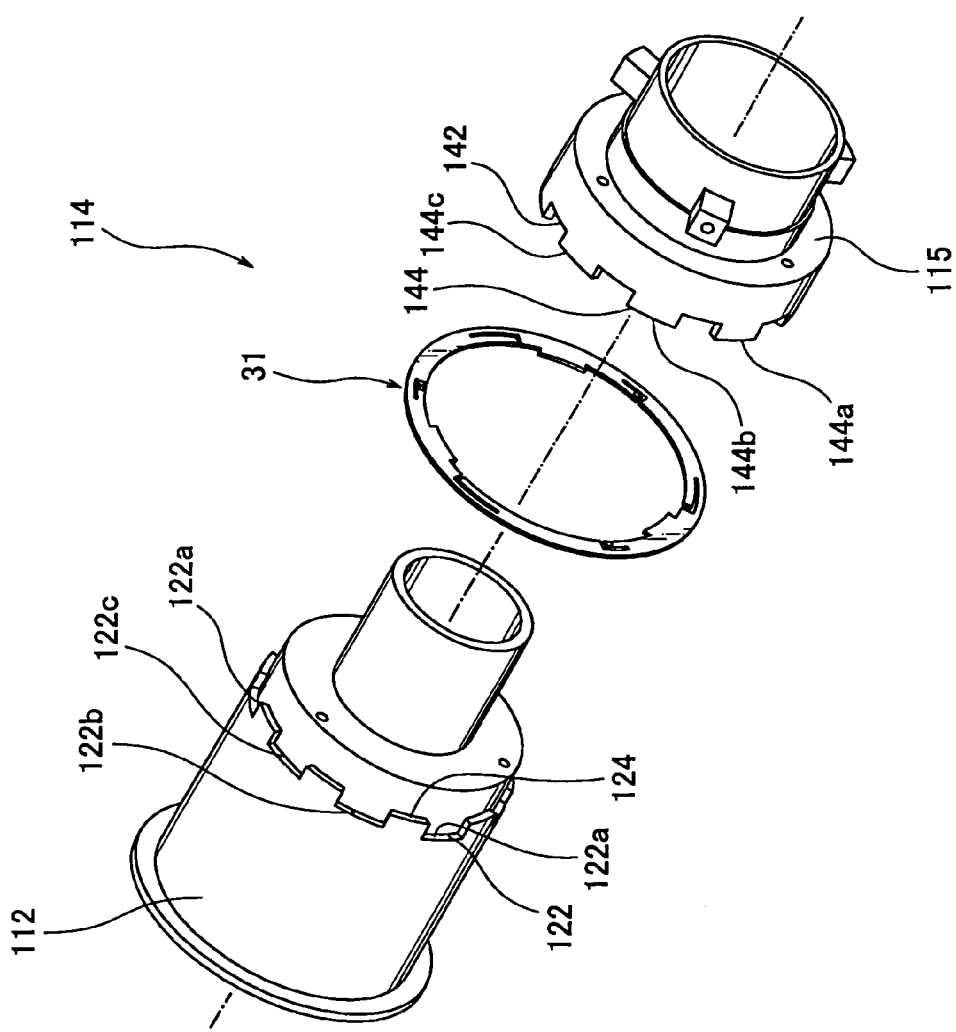
FIG. 7 is an exploded perspective view of the first fixed barrel of a second embodiment of the lens barrel according to the present invention.
Figure 8:
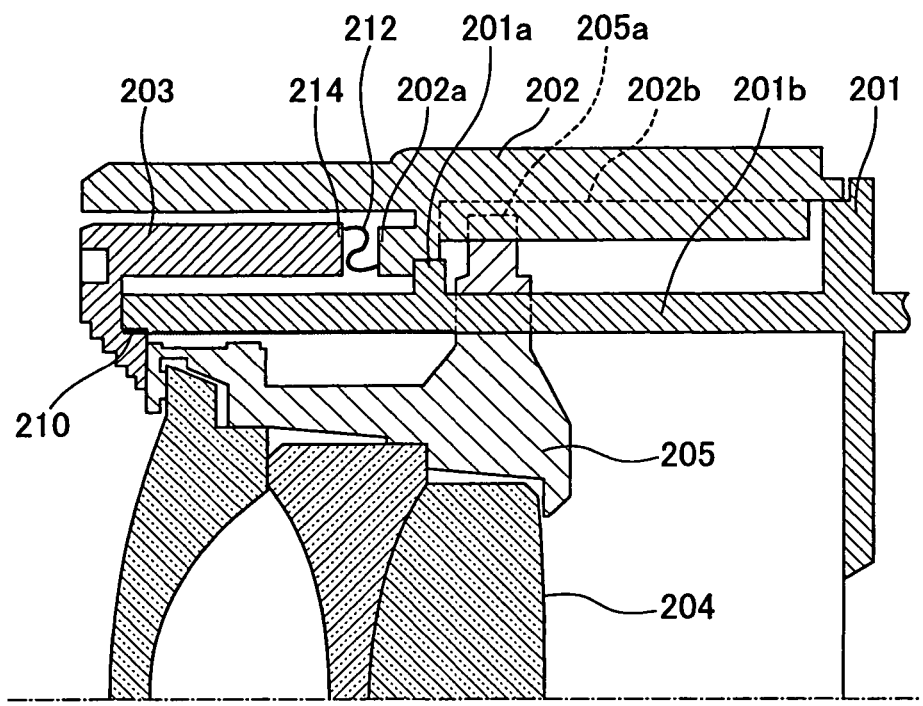
FIG. 8 is a partial sectional view of a prior art embodiment of the lens barrel.
Figure 9:
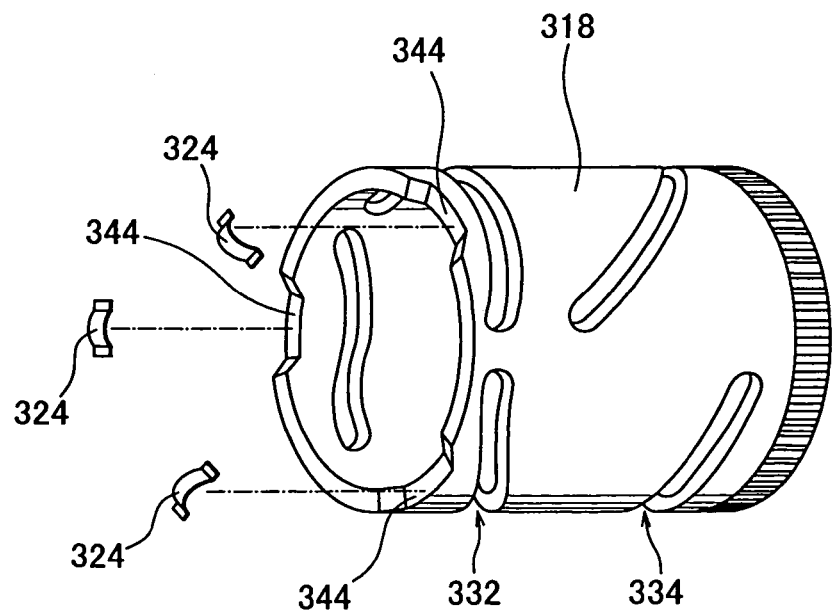
FIG. 9 is a perspective view illustrating a cam ring for another prior art embodiment of the lens barrel.

A second embodiment of the lens barrel according to the present invention is, unlike the first fixed barrel 114 in the aforementioned first embodiment, a sawtoothed mating fixed barrel 114 as shown in FIG. 7. The remaining components of the second embodiment of the lens barrel are almost the same as those in the first embodiment, and therefore, the descriptions of those components are omitted.

The sawtoothed mating fixed barrel 114 is comprised of fore and rear fixed barrel members 112 and 115, and when the fixed barrel 114 is assembled, the barrel member 112 is located closer to the subject and the fixed barrel member 115 is closer to the image field, with the spring elastic member 31 intervening and retained between them. The fixed barrel member 112 has its end face closer to the image field sawtoothed, with recessed portions 122 and raised portions 124 alternately disposed. The recessed portions 122 include a series of recesses 122a, 122b, and 122c of which distances receding towards the subject along the optical axis all vary from one another, and a pattern of these recesses in series is repeated all the way round. All the raised portions 124 have an identical height or distance protruding toward the image field along the optical axis.

The fixed barrel member 115 has its end face closer to the subject sawtoothed, with recessed portions 142 and raised portions 144 alternately disposed. The raised portions 144 include a series of protrusions 144a, 144b, and 144c of which distances protruding towards the subject along the optical axis all vary from one another, and a pattern of these raised portions in series is repeated all the way round. The series of the recesses 122a, 122b, and 122c in the fore fixed barrel member 112 have their respective receding distances complemented with the respective protruding distances of the series of the protrusions 144a, 144b, and 144c in the rear fixed barrel member 115, and therefore, both the fixed barrel members 112 and 115 have their respective sawtoothed edges tightly mated with each other.

In assembling the second embodiment of the lens barrel, allowing for the frictional force derived from the sliding motions of the focusing drive ring 25 and the diaphragm drive ring 32 that have their respective flat ends 25a and 32a pressed respectively by the first and second elastic members 31c and 31d, the detents 31b of the spring elastic member 31 are selectively engaged with any of the recesses 122a, 122b, and 122c. Then, the fore fixed barrel member 112 closer to the subject and the rear fixed barrel member 115 closer to the image field are joined on the edge-to-edge basis so that the recesses 122a, 122b, and 122c are mated with the protrusions 144a, 144b, and 144c. In this way, the spring elastic member 31 is fixed at the detents 31b that are squeezed between the fixed barrel members 112 and 115.

Configured in this way, the lens barrel, with a simple variation in a way of assembling the components but without a replacement of them, is capable of adjusting the frictional force of the focusing drive ring 25 against the rotation force applied thereto through the manipulation so as to impart a torque on the focusing pins 26 in an appropriate perceptible degree.

Similarly, the lens barrel, with a simple variation in a way of assembling the components but without a replacement of them, is capable of adjusting the frictional force of the diaphragm drive ring 32 against the rotation force applied thereto through the manipulation to impart a torque on the diaphragm operating pins 35 in some appropriate perceptible degree.

What is claimed is:

1. A lens barrel in which a fixed barrel has its inner and outer circumferential surfaces provided with at least two slidable-rotatable members that are rotatably held about an optical axis of the fixed barrel but unable to move along the optical axis, an annular member is secured to the fixed barrel between the slidable-rotatable members, the annular member being pivotal about the optical axis and being provided with resilient protrusions on the opposite major surfaces toward the subject and the image field, and the resilient protrusions are pressed against a rear end face of one of the slidable-rotatable members closer to the subject and against a fore end face of the other slidable-rotatable member closer to the image field.

2. A lens barrel as defined in claim 1, wherein the protrusions provided in the annular member are fitted in grooves provided in the fixed barrel in order to secure the annular member to the fixed barrel, the grooves being perpendicular to the optical axis and contiguous to grooves extending along the optical axis.

3. A lens barrel as defined in claim 2, wherein each of the grooves perpendicular to the optical axis is branched more than one in number and provided in more than one depth along the optical axis of the fixed barrel.

4. A lens barrel as defined in claim 1, wherein the fixed barrel is comprised of two barrel members jointed with each other on the edge-to-edge basis in a direction along the optical axis, both the barrel members, when jointed together, creating an abutment at which an object is retained between them, and the object retained between the barrel members is the annular member, the annular member being secured to the fixed barrel when the barrel members jointed together squeeze the protrusions provided in the annular member.

5. A lens barrel as defined in claim 4, wherein the abutment created by the barrel members jointed together is segmented more than one in number and located in more than one depth along the optical axis of the fixed barrel.

6. An optical device in which a fixed barrel has its inner and outer circumferential surfaces provided with at least two slidable-rotatable members that are rotatably held about the optical axis but unable to move along an optical axis of the fixed barrel, an annular member is secured to the fixed barrel between the slidable-rotatable members, the annular member being pivotal about the optical axis and being provided with resilient protrusions on the opposite major surfaces toward the subject and the image field, and the resilient protrusions are pressed against a rear end face of one of the slidable-rotatable members closer to the subject and against a fore end face of the other slidable-rotatable member closer to the image field.

7. A lens barrel comprising a) a fixed barrel, b) at least two rotatable members to be rotatably mounted on said fixed barrel, and c) a resilient element having a first resilient portion for pressing in one direction and a second resilient portion for pressing in another direction, said resilient element pressing one of said rotatable members in the one direction and pressing another of the said rotatable members in the another direction.

8. A lens barrel comprising a) a fixed barrel, b) at least two rotatable members to be rotatably mounted on said fixed barrel, and c) a resilient element having a first resilient portion for pressing in one direction and a second resilient portion for pressing in another direction, said resilient element being located between said two rotatable members and pressing force of said resilient element being adjustable.

* * * * *